US007893907B2

(12) United States Patent
Kang

(10) Patent No.: US 7,893,907 B2
(45) Date of Patent: Feb. 22, 2011

(54) METHOD AND APPARATUS FOR DRIVING LIQUID CRYSTAL DISPLAY

(75) Inventor: Eun Kyeong Kang, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 807 days.

(21) Appl. No.: 11/454,855

(22) Filed: Jun. 19, 2006

(65) Prior Publication Data

US 2007/0146260 A1 Jun. 28, 2007

(30) Foreign Application Priority Data

Dec. 28, 2005 (KR) ...................... 10-2005-0132272

(51) Int. Cl.
*G09G 3/36* (2006.01)
*G09G 5/00* (2006.01)
*G06F 3/038* (2006.01)

(52) U.S. Cl. .......................... 345/94; 345/95; 345/204; 345/208; 345/210

(58) Field of Classification Search .................. 345/94, 345/95, 204, 208, 210
See application file for complete search history.

(56) References Cited

U.S. PATENT DOCUMENTS 5,798,741 A * 8/1998 Kajihara ...................... 345/94
6,456,268 B1 * 9/2002 Takeda ........................ 345/92
6,756,958 B2 * 6/2004 Furuhashi et al. ............ 345/95
2004/0169627 A1 * 9/2004 Hong .......................... 345/89
2004/0263467 A1 * 12/2004 Kitagawa et al. ............ 345/102
2005/0253836 A1 * 11/2005 Kim et al. .................. 345/212

FOREIGN PATENT DOCUMENTS

JP 04-155380 5/1992
JP 06175610 A * 6/1994
JP 06-222328 8/1994
JP 06222328 A * 8/1994
JP 09055908 A * 2/1997
JP 2000-267618 9/2000
JP 2002-169138 6/2002
JP 2005-159595 6/2005
KR 2004048623 A * 6/2004
KR 2005033279 A * 4/2005

* cited by examiner

*Primary Examiner*—Bipin Shalwala
*Assistant Examiner*—Ilana Spar
(74) *Attorney, Agent, or Firm*—McKenna Long & Aldridge LLP

(57) ABSTRACT

An the driving method and apparatus including a liquid crystal display panel provided with a plurality of data lines; a brightness detector to detect a black brightness component and a white brightness component of data supplied to the plurality of data lines; a controller to compare magnitudes of a black brightness amount and a white brightness amount in the white and black brightness components detected by the brightness detector to generate a compared result and to control an application of a common voltage on a basis of a black brightness data level or a white brightness data level of data supplied to the plurality of data lines in accordance with the compared result; and a common voltage generator to generate a common voltage having an application level instructed by the controller and to supply the common voltage to the liquid crystal display panel.

20 Claims, 14 Drawing Sheets

METHOD AND APPARATUS FOR DRIVING LIQUID CRYSTAL DISPLAY

This application claims the benefit of Korean Patent Application No. P2005-0132272, filed on Dec. 28, 2005, which is hereby incorporated by reference for all purposes as if fully set forth herein.

BACKGROUND OF THE INVENTION

1. Field of the Invention

This invention relates to a liquid crystal display and more particularly to a driving method and apparatus for a liquid crystal display wherein a different level of common voltages can be selectively supplied on a basis of black brightness data or white brightness data applied to a liquid crystal display panel.

2. Discussion of the Related Art

A liquid crystal display (LCD) controls light transmittance of liquid crystal cells in accordance with video signals to thereby display a picture. An active matrix liquid crystal display device includes a switching device provided for each liquid crystal cell to allow displaying moving pictures by active control of the switching device. Typically, a thin film transistor (TFT) is employed as the switching device in active matrix liquid crystal display devices as shown in FIG. 1.

Referring to FIG. 1, the active matrix LCD converts supplied digital input data into an analog data voltage using a gamma reference voltage, and supplies the analog data voltage to supply a data line DL. As the analog data voltage is supplied, a scanning pulse is applied to a gate line GL to thereby charge a liquid crystal cell Clc.

A gate electrode of the TFT is connected to the gate line GL while a source electrode thereof is connected to the data line DL. Further, a drain electrode of the TFT is connected to a pixel electrode of the liquid crystal cell Clc and to one electrode of a storage capacitor Cst.

A common electrode of the liquid crystal cell Clc is supplied with a common voltage Vcom.

The storage capacitor Cst stores a data voltage fed from the data line DL when the TFT is turned on, to maintain the voltage at the liquid crystal cell Clc.

When the scanning pulse is applied to the gate line GL the TFT is turned on to provide a conductive channel between the source electrode and the drain electrode thereof to supply a voltage on the data line DL to the pixel electrode of the liquid crystal cell Clc. An electric field generated between the pixel electrode and the common electrode controls the alignment of liquid crystal molecules of the liquid crystal cell to thereby modulate an incident light.

A configuration of a related art LCD including pixels having the above-mentioned structure will be described with reference to FIG. 2.

FIG. 2 is a block diagram showing a configuration of a liquid crystal display device of the related art.

Referring to FIG. 2, a related art liquid crystal display device 100 includes a liquid crystal display panel 110 provided with a thin film transistor (TFT) for driving the liquid crystal cell Clc at a crossing of data lines DL1 to DLm and gate lines GL1 to GLn; a data driver for supplying a data to the data lines DL1 to DLm of the liquid crystal display panel 110; a gate driver 130 for supplying a scanning pulse to the gate lines GL1 to GLn of the liquid crystal display panel 110; a gamma reference voltage generator 140 for generating a gamma reference voltage to supply to the data driver 120; a backlight assembly for irradiating a light onto the liquid crystal display panel 110; an inverter 160 for applying an alternating current voltage and a current to the backlight assembly 160; a common voltage generator 170 for generating a common voltage Vcom to supply to the common electrode of the liquid crystal cell Clc of the liquid crystal display panel 110; a gate driving voltage generator 180 for generating a gate high voltage VGH and a gate low voltage VGL to supply them to the gate driver 130; and a timing controller 190 for controlling the data driver 120 and the gate driver 130.

The liquid crystal display panel 110 includes a liquid crystal layer injected or formed between two glass substrates. On the lower glass substrate of the liquid crystal display panel 110, the data lines DL1 to DLm and the gate lines GL1 to GLn perpendicularly cross each other. A TFT is provided at each crossing between the data lines DL1 to DLm and the gate lines GL1 to GLn. The TFT supplies a data on the data lines DL1 to DLm to the liquid crystal cell Clc in response to a scanning pulse. The gate electrode of the TFT is connected to the gate lines GL1 to GLn while the source electrode thereof is connected to the data line DL1 to DLm. Further, the drain electrode of the TFT is connected to the pixel electrode of the liquid crystal cell Clc and to the storage capacitor Cst.

The TFT is turned on in response to the scanning pulse applied via the gate lines GL1 to GLn, to the gate terminal thereof. Upon turning-on of the TFT, a video data on the data lines DL1 to DLm is supplied to the pixel electrode of the liquid crystal cell Clc.

The data driver 120 supplies data to the data lines DL1 to DLm in response to a data driving control signal DDC from the timing controller 190. Further, the data driver 120 samples and latches a digital video data RGB fed from the timing controller 190, and then converts it into an analog data voltage capable of expressing a gray scale level at the liquid crystal cell Clc of the liquid crystal display panel 110 on a basis of a gamma reference voltage from the gamma reference voltage generator 140 and supplies the analog data voltage the data lines DL1 to DLm.

The gate driver 130 sequentially generates a scanning pulse, that is, a gate pulse in response to a gate driving control signal GDC and a gate shift clock GSC from the timing controller 190 to supply to the gate lines GL1 to GLn. The gate driver 130 determines a high level voltage and a low level voltage of the scanning pulse in accordance with the gate high voltage VGH and the gate low voltage VGL from the gate driving voltage generator 180.

The gamma reference voltage generator 140 receives a power voltage Vcc of 0V to 3.3V supplied from an external system mounted with the liquid crystal display device 100, for example, from a controller (not shown) of an image display equipment such as a television receiver to thereby generate a positive gamma reference voltage and a negative gamma reference voltage. The gamma reference voltage generator 140 outputs the positive and negative gamma reference voltages to the data driver 120.

The backlight assembly 150 is provided at the rear side of the liquid crystal display panel 110 and is energized by an alternating current voltage supplied by the inverter 160 to irradiate a light onto each pixel of the liquid crystal display panel 110.

The inverter 160 converts a rectangular wave signal generated in the interior thereof into a triangular wave signal and then compares the triangular wave signal with a direct current power voltage Vcc supplied from the external system, thereby generating a burst dimming signal proportional to a result of the comparison. A driving integrated circuit (IC) for controlling a generation of the AC voltage and current within the inverter 160 controls a generation of AC voltage and current supplied to the backlight assembly 150 in response to the burst dimming signal.

The common voltage generator 170 receives a high-level power voltage VDD to generate a common voltage Vcom and supplies Vcom to the common electrode of the liquid crystal cell Clc provided at each pixel of the liquid crystal display panel 110.

The gate driving voltage generator 180 is supplied with a power voltage VCC of 3.3V from the external system to generate the gate high voltage VGH and the gate low voltage VGL to be supplied the data driver. The gate driving voltage generator 180 generates a gate high voltage VGH greater than a threshold voltage of the TFT provided at each pixel of the liquid crystal display panel 110 and a gate low voltage VGL less then the threshold voltage of the TFT. The generated gate high voltage VGH and the gate low voltage VGL is used for determining a high level voltage and a low level voltage respectively for the scanning pulse generated by the gate driver 130.

The timing controller 190 supplies a digital video data RGB from a digital video card (not shown) to the data driver 120 and generates a data driving control signal DCC and a gate driving control signal GDC using horizontal and vertical synchronizing signals H and V. The timing controller 190 supplies the data driving control signal and the gate driving control signal in response to a clock signal CLK to the data driver 120 and the gate driver 130, respectively. The data driving control signal DDC includes a source shift clock SSC, a source start pulse SSP, a polarity control signal POL and a source output enable signal SOE. The gate driving control signal GDC includes a gate start pulse GSP and a gate output enable signal GOE.

In the above-described liquid crystal display device of the related art, the black brightness data and the white brightness data supplied to a plurality of data lines DL1 to DLm ideally take a shape of rectangular wave in which a positive (+) polarity region and a negative (−) polarity region are symmetrically divided on the basis of the common voltage Vcom as shown in FIG. 3A. In practice however, the waveforms are distorted due to environmental circumstances and internal resistances, and the waveforms deviate from the ideal rectangular wave shape to instead have voltage drops as shown in FIG. 3B.

As shown in FIG. 3B, both the positive black brightness data and the negative black brightness data are dropped and the drop voltage $\Delta Vp\_B$ of the positive black brightness data has the same magnitude as a drop voltage $\Delta Vp\_B$ of the negative black brightness data. Furthermore, both the positive white brightness data and the negative white brightness data are dropped and a drop voltage $\Delta Vp\_W$ of the positive white brightness data has the same magnitude as a drop voltage $\Delta Vp\_W$ of the negative white brightness data.

More particularly, it can be seen from FIG. 3B that the drop voltage $\Delta Vp\_W$ of the positive and negative white brightness data have at least twice larger magnitude than the drop voltage $\Delta Vp\_B$ of the positive and negative black brightness data.

Because the common voltage Vcom is supplied at a constant value while the black brightness data and the white brightness data are dropped as described above, a charged amount (the voltage charged into a liquid crystal cell) from the positive black brightness data is decreased by the drop voltage $\Delta Vp\_B$ while a charged amount from the negative black brightness data is increased by the drop voltage $\Delta Vp\_B$. Likewise, a charged amount from the positive white brightness data is decreased by the drop voltage $\Delta Vp\_W$ while a charged amount from the negative white brightness data is increased by the drop voltage $\Delta Vp\_W$.

Since the charged amounts of the black brightness data and the white brightness data become non-uniform at the positive region and the negative region a flicker is generated at a picture field. More particularly since a charged amount from the positive white brightness data is considerably decreased in proportion to a magnitude of the drop data $\Delta Vp\_W$ while a charged amount of the negative white brightness data is considerably increased in proportion to a magnitude of the drop data $\Delta Vp\_W$ in the case of the white brightness data rather than the black brightness data a visible flicker occurs in the picture field.

SUMMARY OF THE INVENTION

Accordingly, the present invention is directed to a method and apparatus for driving liquid crystal display that substantially obviates one or more of the problems due to limitations and disadvantages of the related art.

An advantage of the present invention is to provide a driving method and apparatus for a liquid crystal display wherein a different level of common voltages can be selectively supplied on a basis of black brightness data or white brightness data applied to a liquid crystal display panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a driving apparatus for a liquid crystal display includes a liquid crystal display panel provided with a plurality of data lines; a brightness detector to detect a black brightness component and a white brightness component of data supplied to the plurality of data lines; a controller to compare magnitudes of a black brightness amount and a white brightness amount in the white and black brightness components detected by the brightness detector to generate a compared result and to control an application of a common voltage on a basis of a black brightness data level or a white brightness data level of data supplied to the plurality of data lines in accordance with the compared result; and a common voltage generator to generate a common voltage having an application level instructed by the controller and to supply the common voltage to the liquid crystal display panel.

In another aspect of the present invention, a method of driving a liquid crystal display includes supplying a black brightness data and a white brightness data to a plurality of data lines provided at a liquid crystal display panel; generating common voltages having first to nth voltage levels (wherein n is an integer larger than 2); detecting a black brightness amount and a white brightness amount in data supplied to the plurality of data lines; and comparing magnitudes of the detected black brightness amount and the detected white brightness amount to generate a compared result and selectively applying the first to nth common voltages to the liquid crystal display panel on a basis of one of a black brightness data level and white brightness data level in the data supplied to the plurality of data lines in accordance with the compared result.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
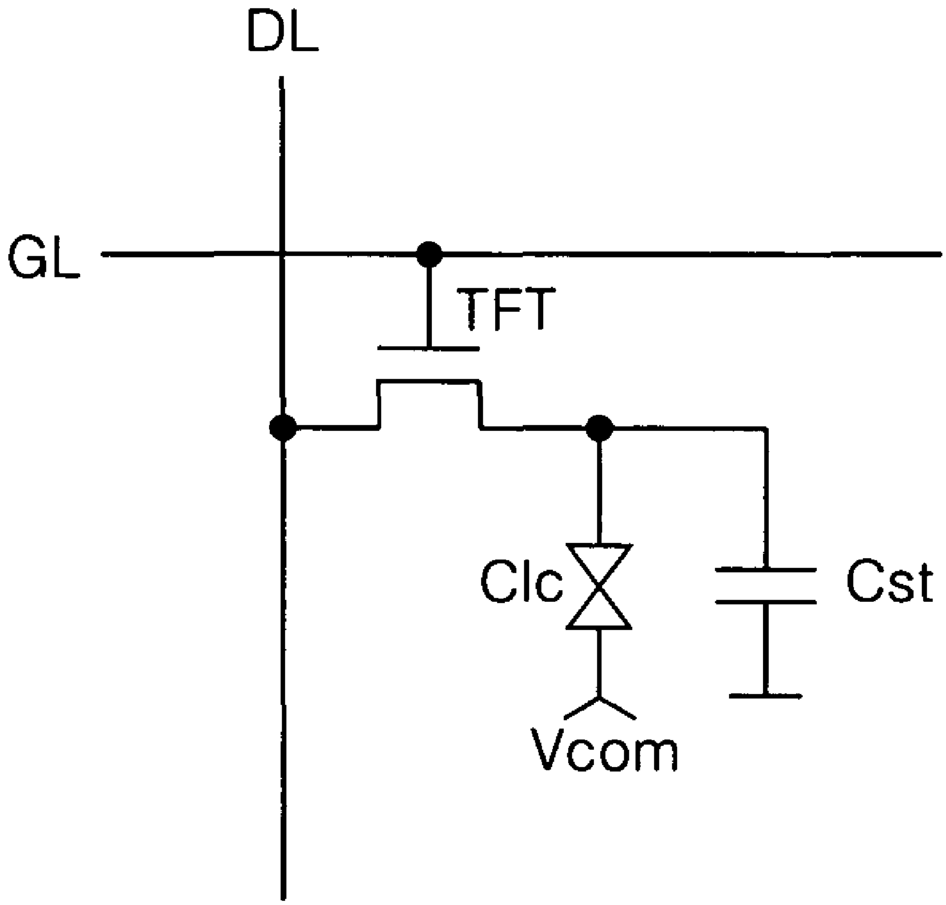
FIG. 1 RELATED ART
FIG. 1 is an equivalent circuit diagram of a pixel provided at a general liquid crystal display device.
Figure 2:
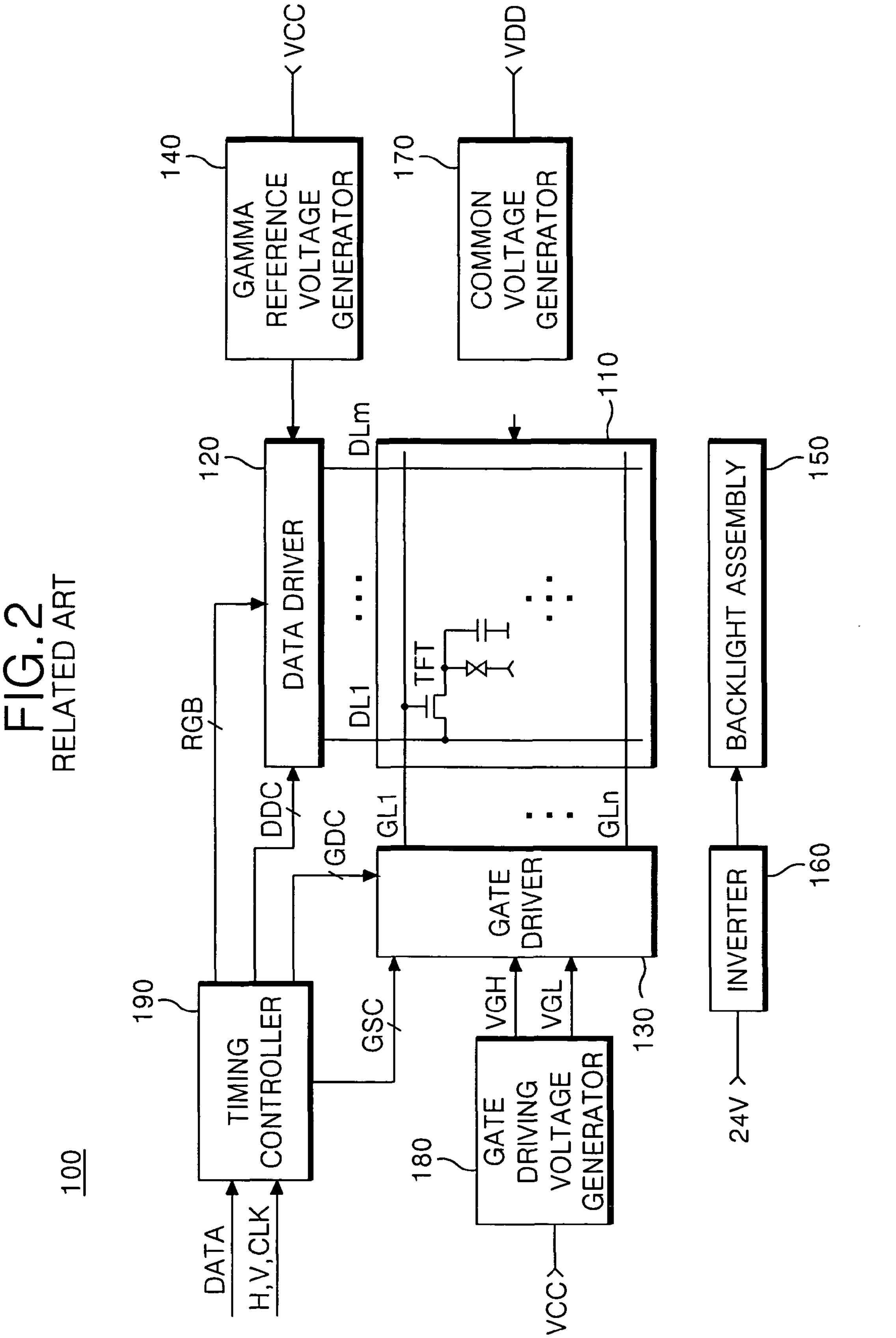
FIG. 2 RELATED ART
FIG. 2 is a block diagram showing a configuration of a general liquid crystal display device.
Figure 3A:
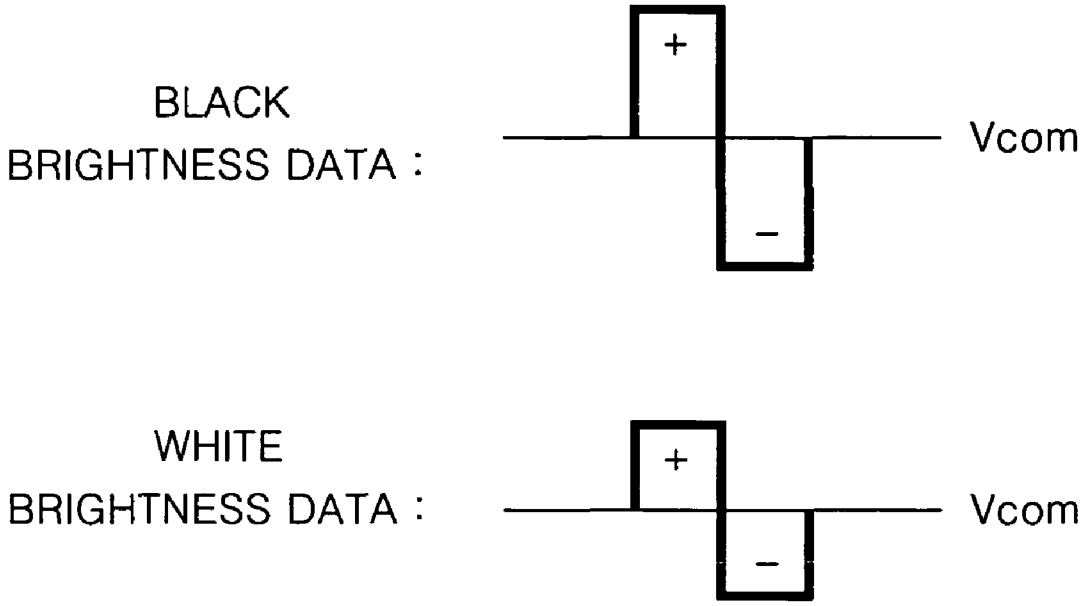
FIG.3A RELATED ART
FIG. 3A presents waveform diagrams of ideal black brightness data and white brightness data supplied to a liquid crystal display panel of a general liquid crystal display device.
Figure 3B:
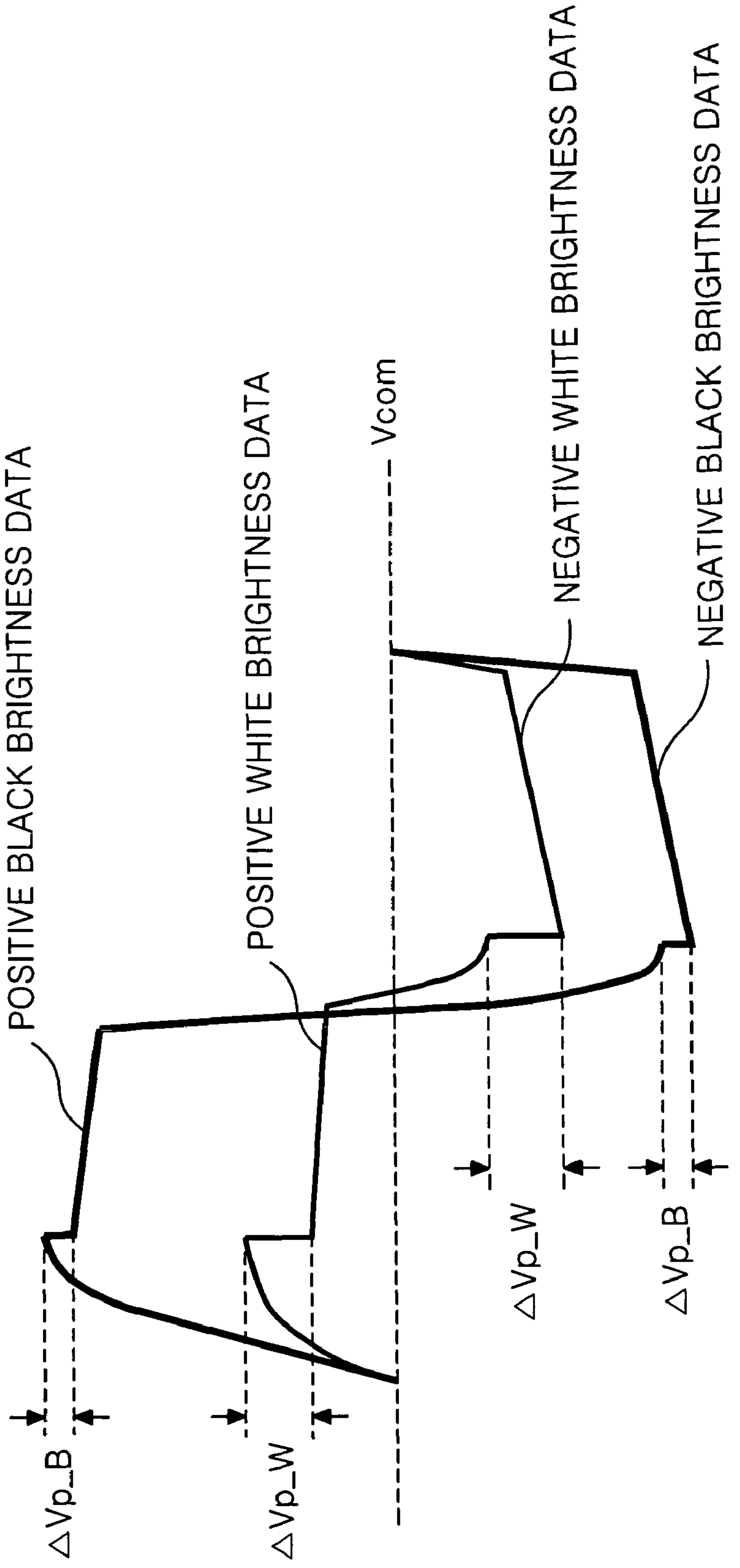
FIG.3B RELATED ART
FIG. 3B illustrates waveforms of black brightness data and white brightness data supplied from a driving apparatus of a related art liquid crystal display device.
Figure 4:
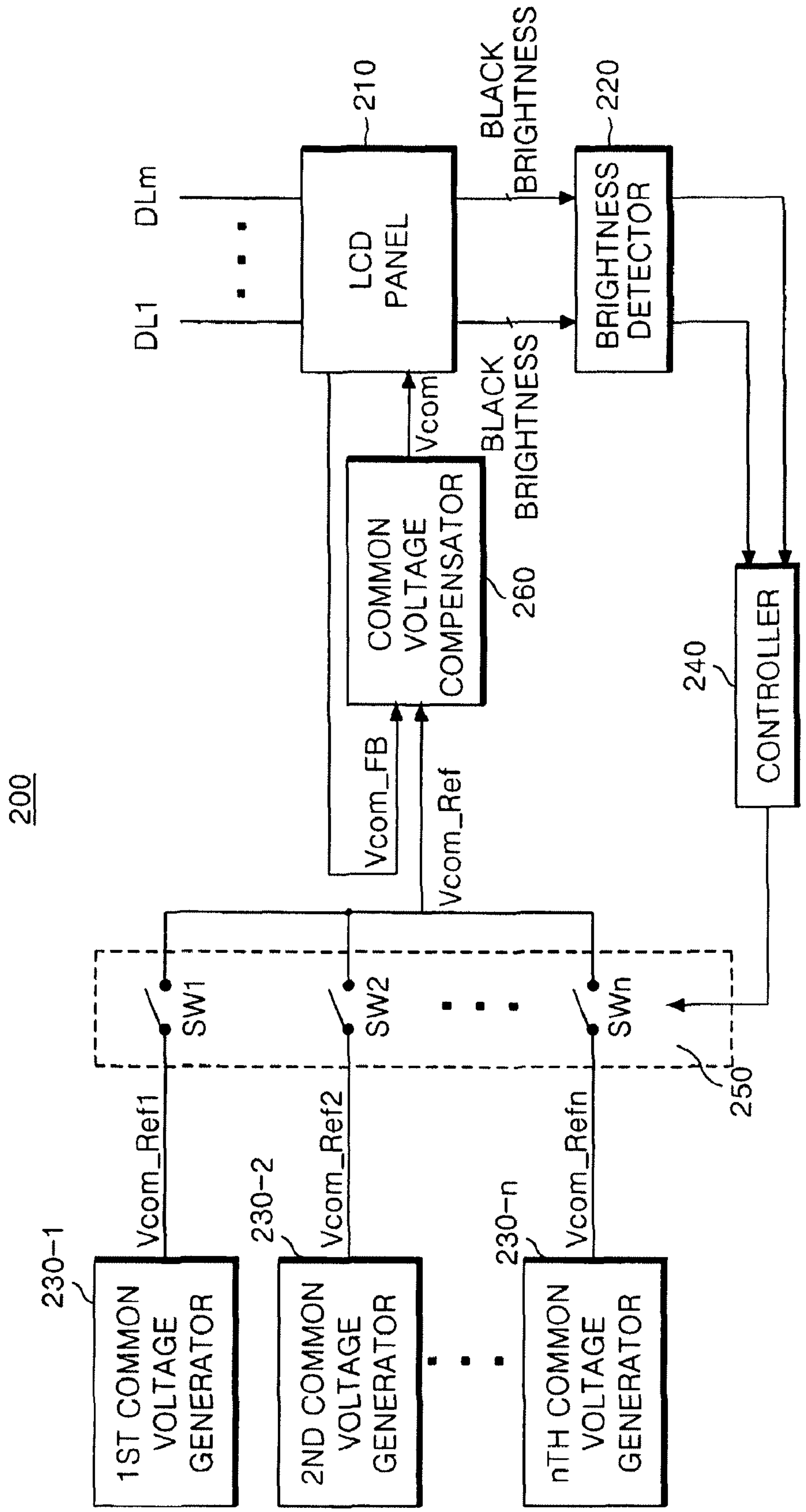
FIG. 4 is a block diagram showing a configuration of a driving apparatus of a liquid crystal display device according to an embodiment of the present invention.

FIG. 4 shows a configuration of a driving apparatus of a liquid crystal display device according to an embodiment of the present invention.

Referring to FIG. 4, the driving apparatus 200 of the liquid crystal display device includes a liquid crystal display panel 210 provided with a plurality of data lines DL1 to DLm; a brightness detector 220 for detecting a black brightness component and a white brightness component supplied to the plurality of data lines DL1 to DLm; 1st to nth common voltage generators 230-1 to **230-*n* for generating and supplying a different level of 1st to nth common voltages Vcom_Ref1 to Vcom_Refn; a controller 240 for comparing magnitudes of a black brightness amount and a white brightness amount detected by the brightness detector 220 to control a selective application of the 1st to nth common voltages Vcom_Ref1 to Vcom_Refn on a basis of a black brightness data level and a white brightness data level supplied to the plurality of data lines DL1 to DLm in accordance with the compared result; and switching devices 250 for switching a common voltage Vcom_Ref having a application level instructed by the controller 240, of the 1st to nth common voltages Vcom_Ref1 to Vcom_Refn, into the liquid crystal display panel 210**.

Further, the driving apparatus 200 of the liquid crystal display device includes a common voltage compensator 260 for compensating the common voltage Vcom_Ref switched by means of the switching devices 250 on a basis of a feedback common voltage Vcom_FB fed back from the liquid crystal display panel 210.

The liquid crystal display panel 210 receives a black brightness data and a white brightness data via the plurality of data lines DL1 to DLm, and receives a common voltage Vcom compensated by the common voltage compensator 260.

The brightness detector 220 detects black brightness components and white brightness components of each gray level supplied to the plurality of data lines DL1 to DLm to supply it to the controller 240.

The 1st to nth common voltage generators 230-1 to **230-*n* receive a high-level power voltage VDD to generate and supply a different level of 1st to nth common voltages Vcom_Ref1 to Vcom_Refn. A detailed circuit configuration of the 1st to nth common voltage generators 230-1 to 230-*n* will be described with reference to FIG. 5A to FIG. 5**C.

The controller 240 controls a selective application of the 1st to nth common voltages Vcom_Ref1 to Vcom_Refn on a basis of a black brightness data level and a white brightness data level supplied to the plurality of data lines DL1 to DLm in accordance with magnitudes of the black brightness amount and the white brightness amount detected by the brightness detector 220 as will be described below.

When a black brightness component and a white brightness component detected by the brightness detector 220 are supplied, the controller 240 compares magnitudes of the black brightness amount and the white brightness amount supplied to the liquid crystal display panel 210 during one frame.

Figure 6A:
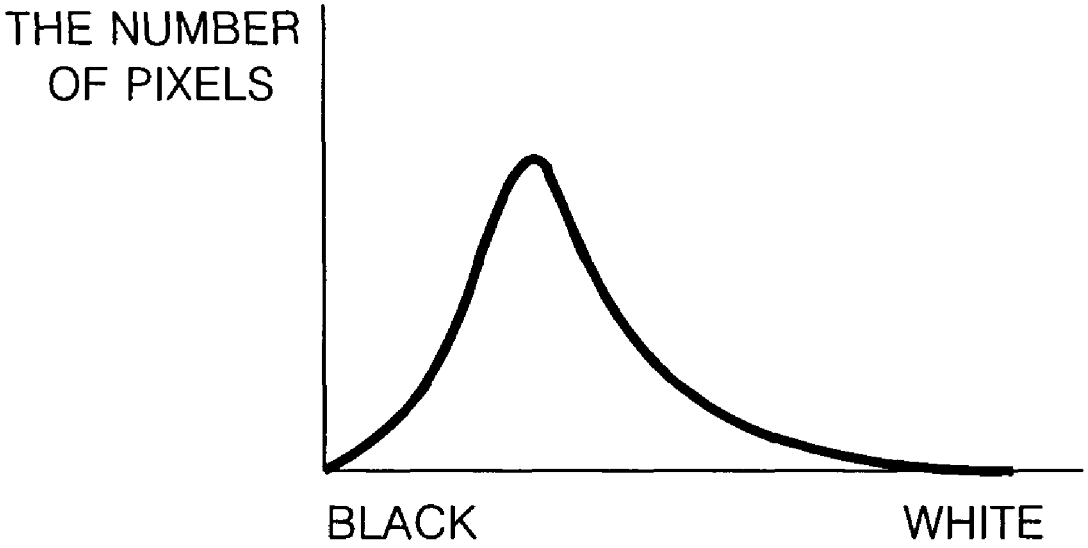
FIG. 6A and FIG. 6B are characteristic diagrams representing a compared state of a black brightness data and a white brightness data detected by the driving apparatus of the liquid crystal display device shown in FIG. 4.

If as the result of the comparison by the brightness detector 220, a black brightness amount is determined to be largest as shown in FIG. 6A the controller 240 makes a controlled application of a level of the common voltage Vcom_Ref on a basis of the black brightness data. The controller 240 uses a predetermined look-up table to control the switching devices 250 to supply the common voltage level established in correspondence with the detected black brightness data level to the liquid crystal display panel 210. In the predetermined look-up table, the 1st to nth common voltages Vcom_Ref1 to Vcom_Refn are defined and the black brightness data levels are established in correspondence with levels of the 1st to nth common voltages Vcom_Ref1 to Vcom_Refn. The controller 240 supplies to the liquid crystal display panel 210 a common voltage level of a the levels of the 1st to nth common voltages Vcom_Ref1 to Vcom_Refn defined at the predetermined look-up table corresponding to the detected black brightness data level.

Figure 6B:
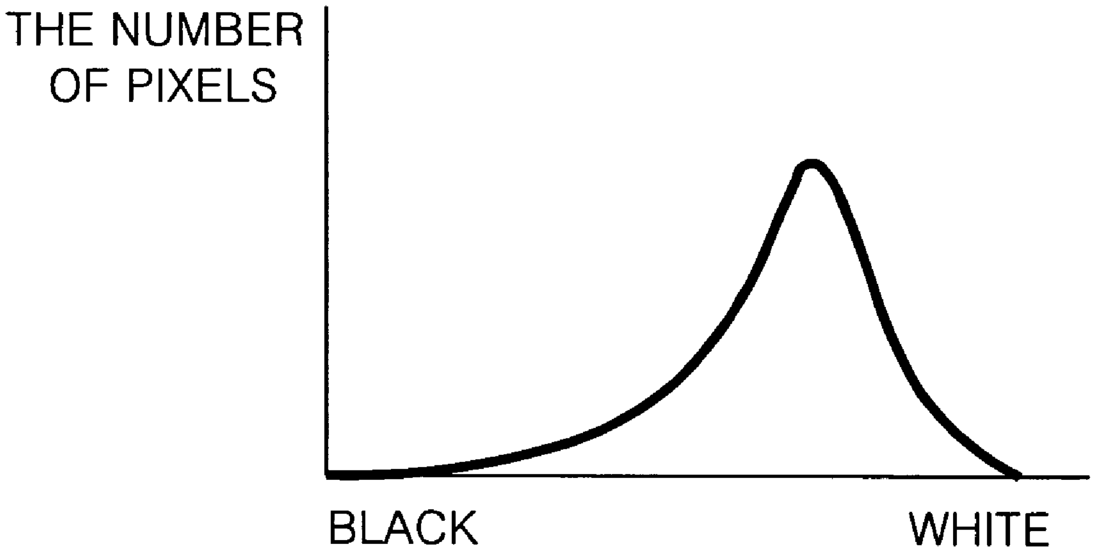

If as the result of the comparison by the brightness detector 220 a white brightness amount is determined to be largest as shown in FIG. 6B, the controller 240 makes a controlled application of a level of the common voltage Vcom_Ref on a basis of the white brightness data. The controller 240 uses a predetermined look-up table to control the switching devices 250 to supply the common voltage level established in correspondence with the detected white brightness data level to the liquid crystal display panel 210. In the predetermined look-up table, the 1st to nth common voltages Vcom_Ref1 to Vcom- _Refn are defined and the white brightness data levels are established in correspondence with levels of the 1st to nth common voltages Vcom_Ref1 to Vcom_Refn. The controller 240 supplies to the liquid crystal display panel 210 a common voltage level of a the levels of the 1st to nth common voltages Vcom_Ref1 to Vcom_Refn defined at the predetermined look-up table corresponding to the detected white brightness data level.

If as the result of the comparison by the brightness detector 220 a black brightness amount is determined to be equal to a white brightness amount, then the controller 240 may be implemented to control the level of the common voltage Vcom_Ref on a basis of the white brightness data. Alternatively, the controller 240 may be implemented to control the level of the common voltage Vcom_Ref on a basis of the black brightness data when a black brightness amount is determined to be equal to a white brightness amount.

The switching devices 250 are configured to include 1st to nth switches SW1 to SWn connected in parallel between the output terminals of the 1st to nth common voltage generators 230-1 to 230-*n* and the input terminal of the common voltage compensator 260. One side of each of the 1st to nth switches SW1 to SWn is connected in correspondence with the output terminals of the respective 1st to nth common voltage generators 230-1 to 230-*n*. The opposite sides of the 1st to nth switches SW1 to SWn are commonly connected to the input terminal of the common voltage compensator 260. The 1st to nth switches SW1 to SWn are selectively switched by means of the controller 240.

For example, if the controller 240 switches the first switch SW1 to supply a level of first common voltage Vcom_Ref1 of a plurality of common voltage levels, then the first switch SW1 directs the first common voltage Vcom_Ref1 generated from the first common voltage generator 230-1 to the liquid crystal display panel 210. If the controller 240 switches the second switch SW2 to supply a level of second common voltage Vcom_Ref2 of a plurality of common voltage levels, then the second switch SW2 directs the common voltage Vcom_Ref2 generated from the second common voltage generator 230-2 to the liquid crystal display panel 210. More generally, if the controller 240 switches the nth switch SWn to supply a level of nth common voltage Vcom_Refn of a plurality of common voltage levels, then the nth switch SWn directs the nth common voltage Vcom_Refn generated from the nth common voltage generator 230-*n* to the liquid crystal display panel 210.

Information concerning the 1st to nth switches SW1 to SWn may be stored along with the black brightness data level and the white brightness data level in correspondence with the 1st to nth common voltages Vcom_Ref1 to Vcom_Refn in the predetermined look-up table. The controller 240 may read out the information about the switches when it reads out the common voltage level for supplying the liquid crystal display panel 210 and may use the switch information to selectively switch the 1st to nth switches SW1 to SWn to apply a desired common voltage level, of the 1st to nth common voltages Vcom_Ref1 to Vcom_Refn generated from the 1st to nth common voltage generators 230-1 to 230-*n*, to the liquid crystal display panel 210.

The common voltage compensator 260 compensates for the common voltage Vcom_Ref switched via the switching devices 250 on a basis of a feedback common voltage Vcom_FB fed back from the liquid crystal display panel 210. A detailed circuit configuration of the common voltage compensator 260 will be described with reference to FIG. 7.

Figure 5A:
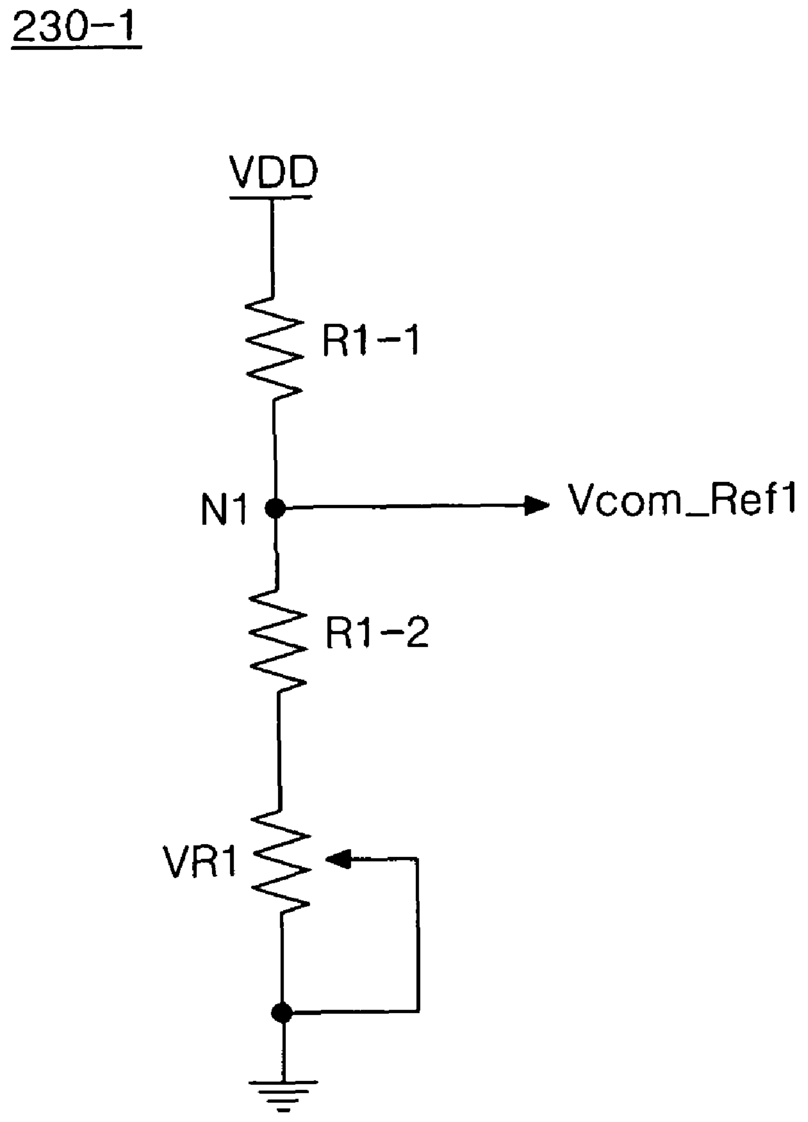
FIGS. 5A, 5B, and 5C are circuit diagrams of first, second and nth common voltage generator provided at the driving apparatus of the liquid crystal display device shown in FIG. 4.
Figure 5B:
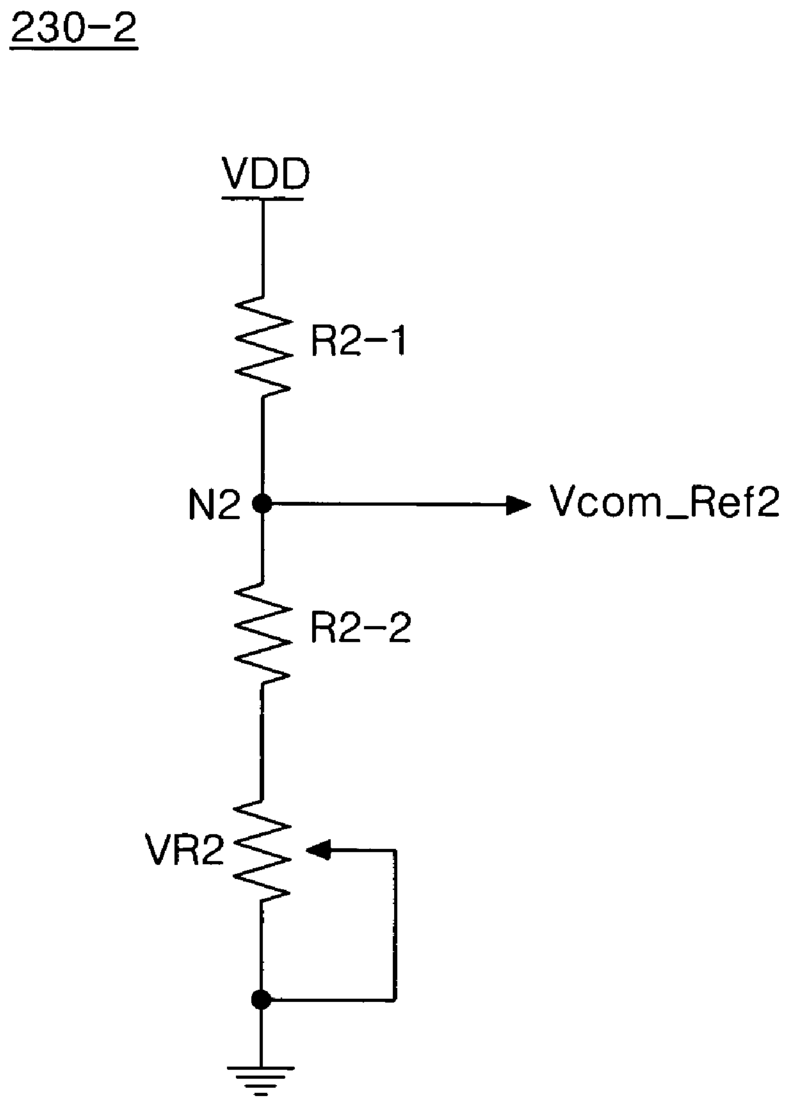
Figure 5C:
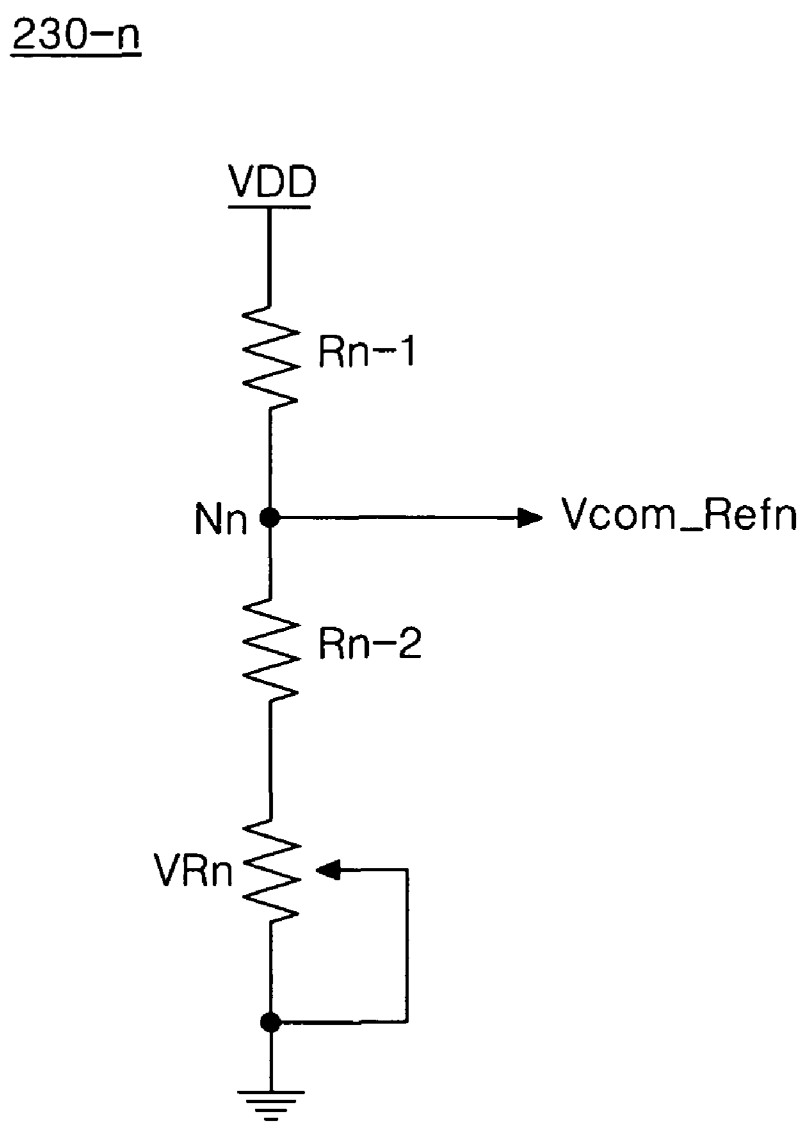

FIG. 5A to FIG. 5C are circuit diagrams of first, second and nth common voltage generator provided at the driving apparatus of the liquid crystal display device according to the embodiment of the present invention.

Referring to FIG. 5A, the 1st common voltage generator 230-1 is configured to include resistors R1-1 and R1-2 and a variable resistor VR1 connected in series between a power voltage VDD and a ground. The first common voltage Vcom_Ref1 is generated at an output node N1 positioned between the resistors R1-1 and R1-2, and a magnitude of the first common voltage Vcom_Ref1 is determined by resistance values of the resistors R1-1 and R1-2 and a resistance value of the variable resistor VR1.

Referring to FIG. 5B, the second common voltage generator 230-2 is configured by resistors R2-1 and R2-2 and a variable resistor VR2 connected, in series, between the power voltage VDD and the ground in turn. The second common voltage Vcom_Ref2 is generated at an output node N2 positioned between the resistors R2-1 and R2-2, and a magnitude of the second common voltage Vcom_Ref2 is determined by resistance values of the resistors R2-1 and R2-2 and a resistance value of the variable resistor VR2.

Referring to FIG. 5C, the nth common voltage generator 230-*n* is configured by resistors Rn-1 and Rn-2 and a variable resistor VRn connected, in series, between the power voltage VDD and the ground in turn. The nth common voltage Vcom_Refn is generated at an output node Nn positioned between the resistors Rn-1 and Rn-2, and a magnitude of the nth common voltage Vcom_Refn is determined by resistance values of the resistors Rn-1 and Rn-2 and a resistance value of the variable resistor VRn.

In the foregoing description, only example circuit configurations of the 1st, 2nd and nth common voltage generators 230-1, 230-2 and 230-*n* shown in the drawings. However, the 3rd to (n−1)th common voltage generators 230-3 to 230-(*n*−1) have circuit configurations analogous to the 1st, 2nd and nth common voltage generators 230-1, 230-2, and with the resistors of the generators having different resistance values selected to generate the corresponding Vcom_Ref voltages.

Figure 7:
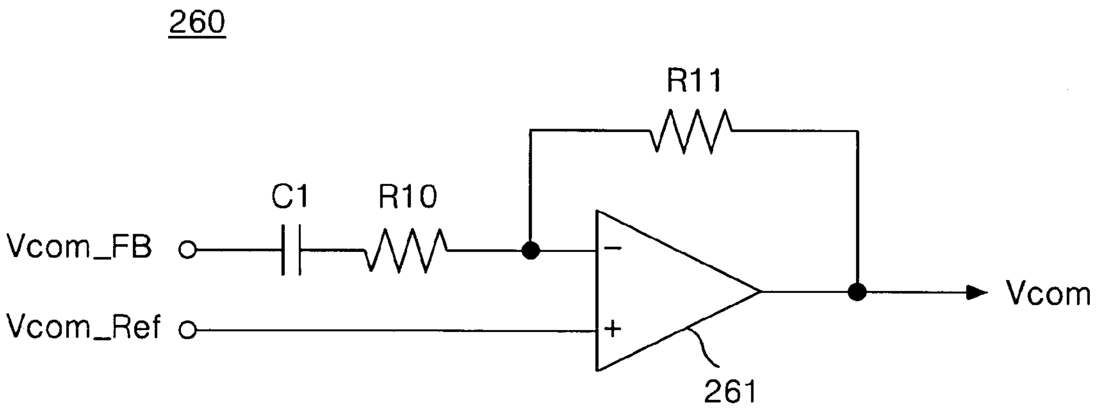
FIG. 7 is a circuit diagram of a common voltage compensator provided at the driving apparatus of the liquid crystal display device shown in FIG. 4.

FIG. 7 is a circuit diagram of a common voltage compensator provided at the driving apparatus of the liquid crystal display device according to the embodiment of the present invention.

Referring to FIG. 7, the common voltage compensator 260 includes an operational amplifier 261 for compensating for the common voltage Vcom_Ref inputted to a non-inverting input terminal (+) thereof on a basis of the feedback common voltage Vcom_FB inputted to an inverting input terminal (−) thereof to apply it to the liquid crystal display panel 210; a capacitor C1 and a resistor R10 connected in series to the inverting input terminal (−) of the operational amplifier 261; and a negative feedback resistor R11 connected between the inverting input terminal and the output terminal of the comparator 261.

The operational amplifier 261 inverts a ripple loaded on the feedback common voltage Vcom_FB fed back from the liquid crystal display panel 210 and inputted to the inverting input terminal (−) thereof and makes a differential amplification of feedback common voltage Vcom_FB fed back to supply to the liquid crystal display panel 210. Further, the operational amplifier 261 compensates for the common voltage Vcom_Ref switched via the switching devices 250 and applied to the non-inverting input terminal of the operational amplifier 261 using the feedback common voltage Vcom_FB fed back from the liquid crystal display panel 210 and inputted to the inverting input terminal (−) thereof, and supplies the compensated common voltage Vcom loaded with the inverted ripple to the liquid crystal display panel 210.

A procedure in which the present driving apparatus for the liquid crystal display device having the above-mentioned configuration selectively supplies a plurality of common voltage levels will be described with reference to the flow chart of FIG. 8.

Figure 8:
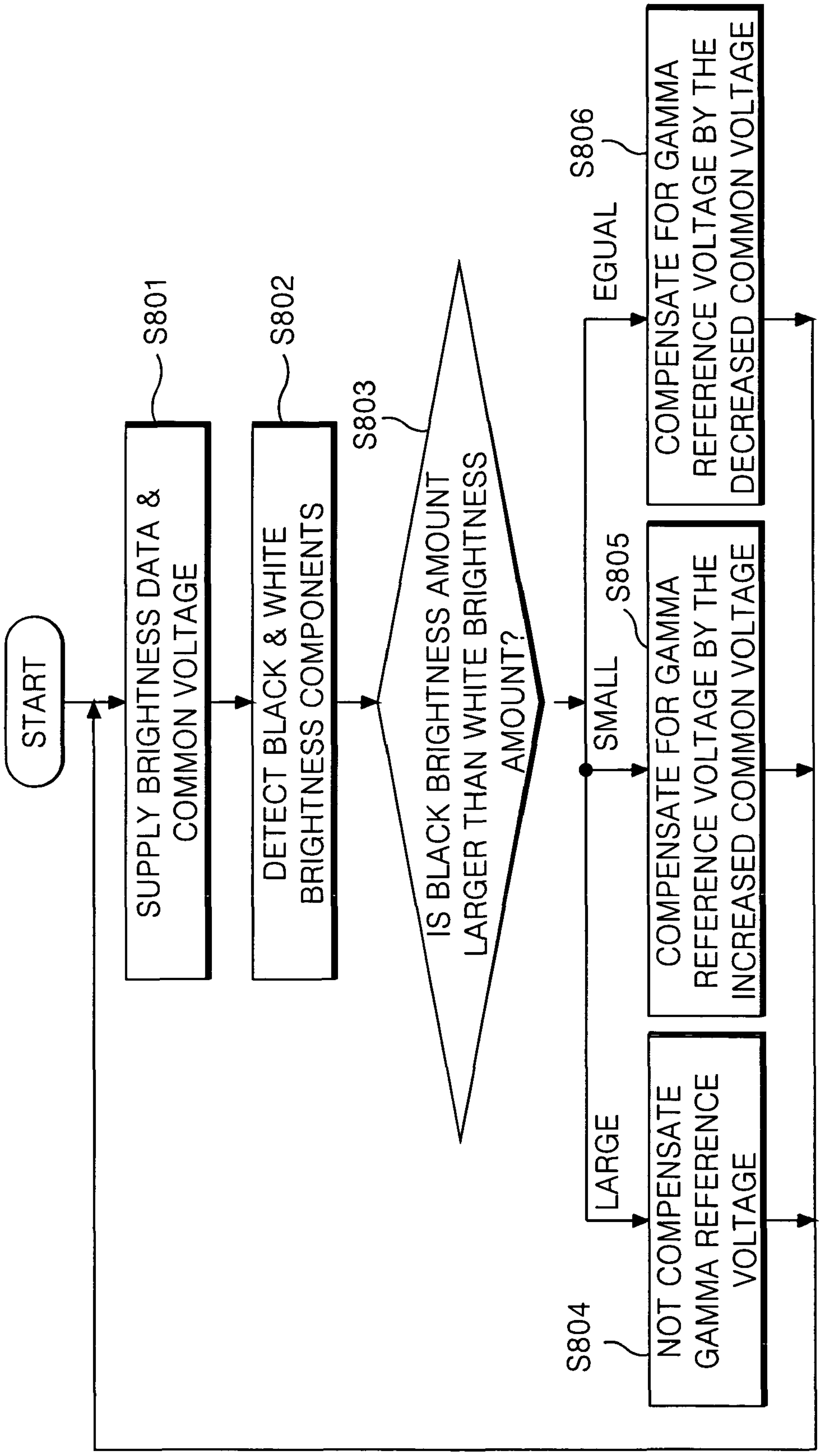
FIG. 8 is a flow chart showing a driving method of the liquid crystal display device according to the embodiment of the present invention.

FIG. 8 is a flow chart showing a driving method of the liquid crystal display device according to the embodiment of the present invention.

Referring to FIG. 8, a black brightness data and a white brightness data are supplied to a plurality of data lines DL1 to DLm and a common voltage Vcom is supplied to the liquid crystal display panel 210 at a step S801.

The brightness detector 220 detects a black brightness component and a white brightness component of each gray level supplied to the plurality of data lines DL1 to DLm and applies them to the controller 240 at a step S802. The controller 240 determines whether a black brightness amount supplied to the liquid crystal display panel 210 during one frame is larger than a white brightness amount at a step S803.

Figure 9:
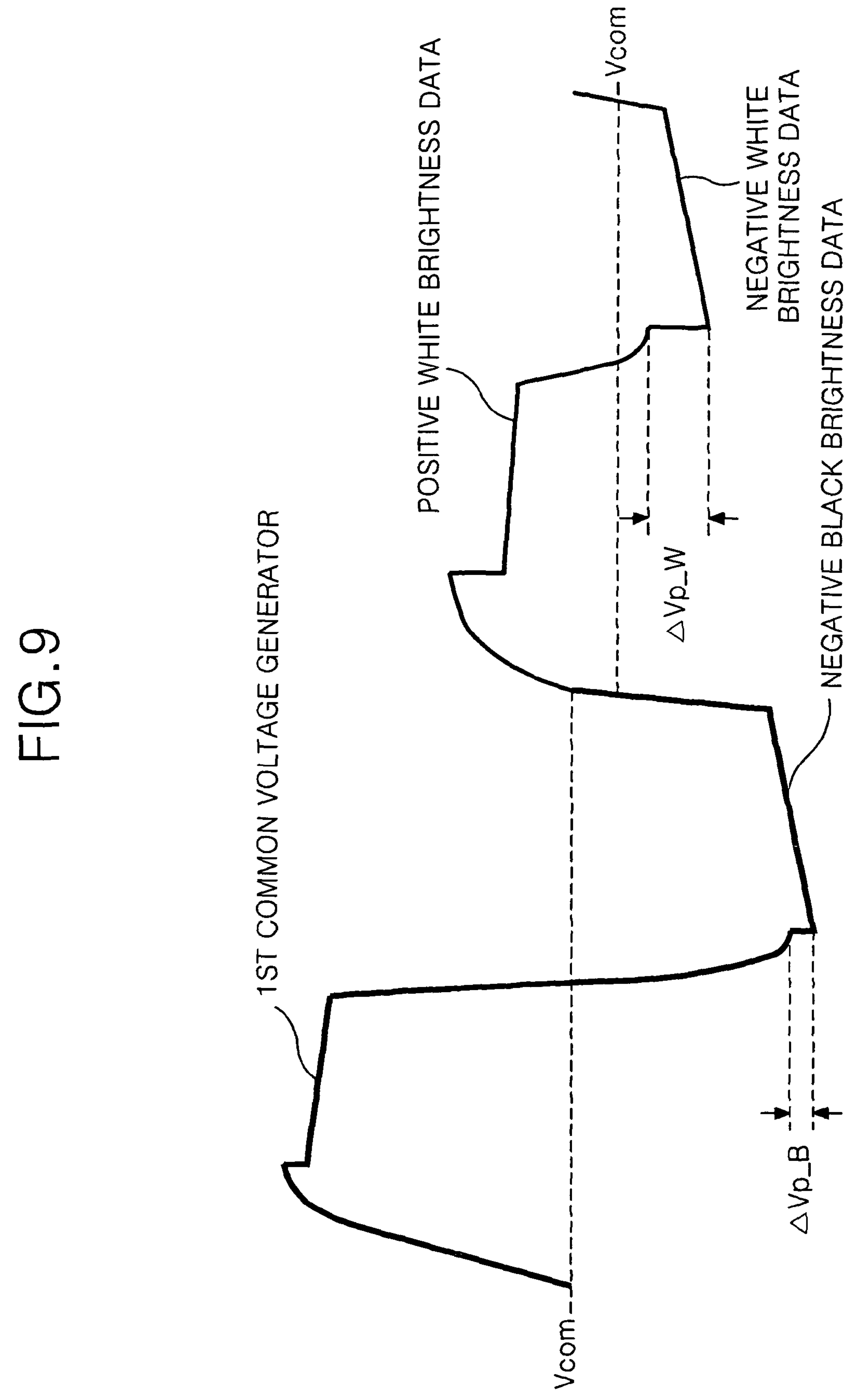
FIG. 9 is a waveform diagram of a common voltage supplied from the driving apparatus of the liquid crystal display device shown in FIG. 4.

Based on the determination result, if the black brightness amount is largest as shown in FIG. 6A, then the controller 240 establishes a level of the common voltage Vcom_Ref corresponding with a black brightness data level detected by selecting one of the 1st to nth common voltages Vcom_Ref1 to Vcom_Refn as defined in a predetermined look-up table to be applied to the liquid crystal display panel 210 at step S804. In other words, the controller 240 supplies the common voltage Vcom on a basis of the black brightness data as shown in FIG. 9 to allow a charged amount from the black brightness data to be uniform at a positive region and a negative region, thereby preventing a generation of flicker on the picture field.

On the other hand, if based on the determination result the white brightness amount is largest as shown in FIG. 6B, the controller 240 establishes a level of the common voltage Vcom_Ref corresponding with a white brightness data level detected by selecting one of the 1st to nth common voltages Vcom_Ref1 to Vcom_Refn as defined in a predetermined look-up table to be applied to the liquid crystal display panel 210 at a step S805. In other words, the controller 240 supplies the common voltage Vcom on a basis of the white brightness data as shown in FIG. 9 to allow a charged amount from the white brightness data to be uniform at a positive region and a negative region, thereby preventing a generation of flicker on the picture field.

Otherwise, if based on the determination result the white brightness amount is equal to the black brightness amount, the controller 240 establishes a level of the common voltage Vcom_Ref corresponding with a white brightness data level detected by selecting one of the 1st to nth common voltages Vcom_Ref1 to Vcom_Refn as defined in a predetermined look-up table to be applied to the liquid crystal display panel 210 at a step S806. Alternatively, driving apparatus may be implemented such that the controller 240 controls a level of the common voltage Vcom_Ref on a basis of the black brightness data when the white brightness amount is equal to the black brightness amount.

Figure 10:
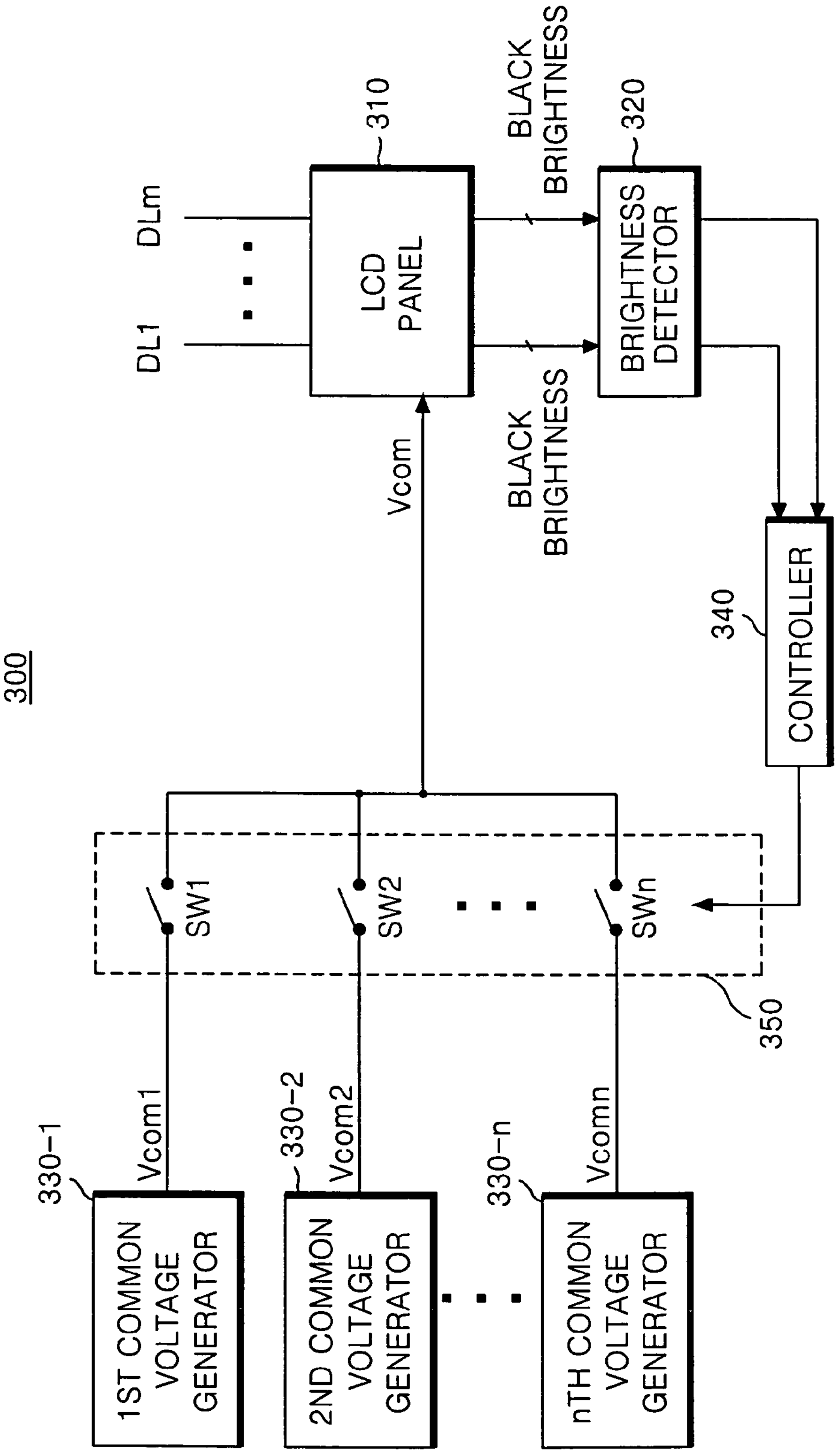
FIG. 10 is a block diagram showing a configuration of a driving apparatus of a liquid crystal display device according to another embodiment of the present invention.

FIG. 10 shows a configuration of a driving apparatus of a liquid crystal display device according to another embodiment of the present invention.

Referring to FIG. 10, the driving apparatus 300 of the liquid crystal display device includes a liquid crystal display panel 310 provided with a plurality of data lines DL1 to DLm; a brightness detector 320 for detecting a black brightness component and a white brightness component supplied to the plurality of data lines DL1 to DLm; 1st to nth common voltage generators 330-1 to **330-*n* for generating and supplying a different level of 1st to nth common voltages Vcom1 to Vcomn; a controller 340 for comparing magnitudes of a black brightness amount and a white brightness amount detected by the brightness detector 320 to control a selective application of one of the 1st to nth common voltages Vcom1 to Vcomn on a basis of a black brightness data level or a white brightness data level supplied to the plurality of data lines DL1 to DLm in accordance with the compared result; and switching devices 350 for switching a common voltage Vcom having a application level instructed by the controller 340 of one of the 1st to nth common voltages Vcom1 to Vcomn, into the liquid crystal display panel 310**.

The liquid crystal display panel 310 receives a black brightness data and a white brightness data via the plurality of data lines DL1 to DLm, and receives a common voltage Vcom.

The brightness detector 320 detects black brightness components and white brightness components of each gray level supplied to the plurality of data lines DL1 to DLm to supply it to the controller 340.

The 1st to nth common voltage generators 330-1 to **330-*n* each receive a high-level power voltage VDD to generate and supply different levels of 1st to nth common voltages Vcom1** to Vcomn.

The controller 340 controls a selection of one of the 1st to nth common voltages Vcom1 to Vcomn based on the black brightness data level and the white brightness data level supplied to the plurality of data lines DL1 to DLm in accordance with magnitudes of the black brightness amount and the white brightness amount detected by the brightness detector 320 as will be described below.

When a black brightness component and a white brightness component detected by the brightness detector 320 are inputted, the controller 340 compares magnitudes of the black brightness amount and the white brightness amount supplied to the liquid crystal display panel 210 during one frame.

If as the result of the comparison a black brightness amount is largest as shown in FIG. 6A, the controller 340 makes a selects a level of the common voltage Vcom on a based of the black brightness data. The controller 340 uses a predetermined look-up table to control the switching devices to supply the common voltage level established in correspondence with the detected black brightness data level to the liquid crystal display panel 310. In the predetermined look-up table, the 1st to nth common voltages Vcom1 to Vcomn has been defined and the black brightness data levels are established in correspondence with levels of the 1st to nth common voltages Vcom1 to Vcomn. In other words, the controller 340 applies a common voltage level corresponding to the detected black brightness data level, of one of the levels of the 1st to nth common voltages Vcom1 to Vcomn defined at the predetermined look-up table to the liquid crystal display panel 310.

If as the result of the comparison a white brightness amount is largest as shown in FIG. 6B, the controller 340 makes a selects a level of the common voltage Vcom on a based of the white brightness data. The controller 340 uses a predetermined look-up table to control the switching devices to supply the common voltage level established in correspondence with the detected white brightness data level to the liquid crystal display panel 310. In the predetermined look-up table, the 1st to nth common voltages Vcom1 to Vcomn has been defined and the white brightness data levels are established in correspondence with levels of the 1st to nth common voltages Vcom1 to Vcomn. In other words, the controller 340 applies a common voltage level corresponding to the detected white brightness data level, of one of the levels of the 1st to nth common voltages Vcom1 to Vcomn defined at the predetermined look-up table to the liquid crystal display panel 310.

If a black brightness amount is equal to a white brightness amount, then the controller 240 may implement the present driving apparatus to control the level of the common voltage Vcom on a basis of the white brightness data. Alternatively, the controller 240 may implements the driving apparatus to control the level of the common voltage Vcom on a basis of the black brightness data when the black brightness amount is equal to the white brightness amount.

The switching devices 350 are configured to include 1st to nth switches SW1 to SWn connected in parallel between the output terminals of the 1st to nth common voltage generators 330-1 to 330-*n* and the liquid crystal display panel 310. One side of each of the 1st to nth switches SW1 to SWn is connected in correspondence with the output terminals of the respective 1st to nth common voltage generators 330-1 to 330-*n*. The opposite sides of the 1st to nth switches SW1 to SWn are commonly connected to the liquid crystal display panel 310. The 1st to nth switches SW1 to SWn having the above-described connection structure are selectively switched by means of the controller 340.

For example, if the controller 340 switches the first switch SW1 to supply a level of first common voltage Vcom1 of a plurality of common voltage levels the first switch SW1 is controlled to connect the first common voltage Vcom1 generated from the first common voltage generator 330-1 to the liquid crystal display panel 310. If the controller 340 switches the second switch SW2 to supply a level of second common voltage Vcom2 of a plurality of common voltage levels, then the second switch SW2 is controlled to connect second common voltage Vcom2 generated from the second common voltage generator 330-2 to the liquid crystal display panel 310. More generally, if the controller 340 switches the nth switch SWn to supply a level of nth common voltage Vcomn of a plurality of common voltage levels, then the nth switch SWn is controlled to connect the nth common voltage Vcomn generated from the nth common voltage generator 330-*n* to the liquid crystal display panel 310.

In order that the controller 340 may selectively switch the 1st to nth switches SW1 to SWn to apply a desired common voltage level, of the 1st to nth common voltages Vcom1 to Vcomn generated from the 1st to nth common voltage generators 330-1 to 330-*n*, to the liquid crystal display panel 310, information about the 1st to nth switches SW1 to SWn may be stored along with the black brightness data level and the white brightness data level, in correspondence with the 1st to nth common voltages Vcom1 to Vcomn in the predetermined look-up table. Thus, the controller 340 can read out information for controlling the switches along with (or instead of) the common voltage level to be supplied to the liquid crystal display panel 310.

As described above, according to the present invention, a common voltage is supplied on a basis of the black brightness data level if the black brightness amount supplied to the liquid crystal display panel is larger than the white brightness amount; and a common voltage is supplied on a basis of the white brightness data level if the white brightness amount is larger than the black brightness amount, thereby allowing charged amounts of the positive black brightness data and the negative black brightness data divided on a basis of the common voltage to be equal to each other and, at the same time thus allowing charged amounts of the positive white brightness data and the negative white brightness data to be equal to each other. Accordingly, it becomes possible to prevent a flicker from being generated on the picture field.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A driving apparatus for a liquid crystal display, comprising:

a liquid crystal display panel provided with a plurality of data lines;

a brightness detector to detect a black brightness component and a white brightness component of data supplied to the plurality of data lines;

a controller to compare magnitudes of a black brightness amount with a white brightness amount in the white and black brightness components detected by the brightness detector during one frame to generate a compared result and to control an application of a common voltage on a basis of a black brightness data level or a white brightness data level of data supplied to the plurality of data lines in accordance with the compared result;

a common voltage generator to generate the common voltage having an application level instructed by the controller and to supply the common voltage to the liquid crystal display panel;

a switching device for switching the common voltage having an application level instructed by the controller into the liquid crystal display panel; and a common voltage compensator for compensating the common voltage by means of the switching device on basis of a feedback common voltage from the liquid crystal display device, wherein the controller uses a predetermined look-up table to control the switching device to supply the common voltage level established in correspondence with the detected black and white brightness data levels to the liquid crystal display panel, wherein the common voltage generator includes first to nth common voltages level generators to generate a different level of first to nth common voltages (wherein n is an integer larger than 2), wherein the switching device includes first to nth switches connected in parallel between output terminals of the first to nth common voltages level generators and an input terminal of the common voltage compensator, wherein the first to nth switches are selectively switched by means of the controller, wherein if the controller switches the first switch to supply a level of first common voltage among first to nth common voltages, then the first switch directs the first common voltage to the liquid crystal display panel, wherein the first to nth common voltages are defined and the black brightness data levels and the white brightness data levels are established in correspondence with levels of the first to nth common voltages in the predetermined look-up table.

2. The driving apparatus as claimed in claim 1, wherein the controller is arranged to control an application level of the common voltage on a basis of black brightness data level when the black brightness amount detected by the brightness detector is larger than the white brightness amount detected by the brightness detector.

3. The driving apparatus as claimed in claim 2, wherein the controller is arranged to selectively control the first to nth switches to apply a common voltage level to the liquid crystal display panel, wherein the common voltage level is a level of one of the first to nth common voltage levels corresponding to the black brightness data level according to a correspondence stored in the predetermined lookup table.

4. The driving apparatus as claimed in claim 1, wherein the controller is arranged to control an application level of the common voltage level on a basis of white brightness data level when the white brightness amount detected by the brightness detector is larger than the black brightness amount detected by the brightness detector.

5. The driving apparatus as claimed in claim 4, wherein the controller is arranged to selectively control the first to nth switches to apply the common voltage level to the liquid crystal display panel, wherein the common voltage level is one of the first to nth common voltage levels corresponding to the white brightness data level according to a correspondence stored in the predetermined lookup table.

6. The driving apparatus as claimed in claim 1, wherein the controller is arranged to control an application level of the common voltage level on a basis of the black brightness data level when the black brightness amount and the white brightness amount detected by the brightness detector are equal to each other.

7. The driving apparatus as claimed in claim 6, wherein the controller is arranged to selectively control the first to nth switches to apply the common voltage level to the liquid crystal display panel, wherein the common voltage level is one of the first to nth common voltage levels corresponding to a black brightness data level according to a correspondence stored in the predetermined lookup table.

8. The driving apparatus as claimed in claim 1, wherein the controller is arranged to control an application level of the common voltage level on a basis of the white brightness data level when the black brightness amount and the white brightness amount detected by the brightness detector are equal to each other.

9. The driving apparatus as claimed in claim 8, wherein the controller is arranged to selectively control the first to nth switches to apply the common voltage level to the liquid crystal display panel, wherein the common voltage level is one of the first to nth common voltage levels corresponding to a white brightness data level according to a correspondence stored in the predetermined lookup table.

10. A method of driving a liquid crystal display comprising:

supplying a black brightness data and a white brightness data to a plurality of data lines provided at a liquid crystal display panel;

generating common voltages having first to nth voltage levels (wherein n is an integer larger than 2) using a first to nth common voltage level generators;

detecting a black brightness amount and a white brightness amount in data supplied to the plurality of data lines;

comparing magnitudes of the detected black brightness amount with the detected white brightness amount to generate a compared result by using a controller during one frame and selectively applying the first to nth common voltages to the liquid crystal display panel on a basis of one of a black brightness data level and white brightness data level in the data supplied to the plurality of data lines in accordance with the compared result;

selectively switching the common voltage having a application level instructed by the controller into the liquid crystal display panel; and compensating for a common voltage selected from the first to nth common voltages on a basis of a feedback common voltage from the liquid crystal display panel to apply it to the liquid crystal display panel, wherein the controller uses a predetermined look-up table to control a switching circuit to supply the common voltage level established in correspondence with the detected black and white brightness data levels to the liquid crystal display panel, wherein the common voltage generator includes first to nth common voltages level generators to generate a different level of first to nth common voltages (wherein n is an integer larger than 2 wherein the switching circuit includes first to nth switches connected in parallel between output terminals of the first to nth common voltages level generators and an input terminal of the common voltage compensator, wherein the first to nth switches are selectively switched by means of the controller, wherein if the controller switches the first switch to supply a level of first common voltage among first to nth common voltages, then the first switch directs the first common voltage to the liquid crystal display panel, wherein the first to nth common voltages are defined and the black brightness data levels and the white brightness data levels are established in correspondence with levels of the first to nth common voltages in the predetermined look-up table.

11. The method as claimed in claim 10, wherein selectively applying the first to nth common voltages to the liquid crystal display panel includes:

controlling an application level of the common voltage level on a basis of the black brightness data level when the black brightness amount is larger than the white brightness amount based on the compared result.

12. The method as claimed in claim 11, wherein selectively applying the first to nth common voltages to the liquid crystal display panel includes:

applying the common voltage level established in correspondence with the black brightness data level of the first to nth common voltage levels defined at the predetermined look-up table to the liquid crystal display panel.

13. The method as claimed in claim 10, wherein selectively applying the first to nth common voltages to the liquid crystal display panel includes:

controlling an application level of the common voltage level on a basis of the white brightness data level when the detected white brightness amount is larger than the detected black brightness amount.

14. The method as claimed in claim 13, wherein selectively applying the first to nth common voltages to the liquid crystal display panel includes:

applying the common voltage level established in correspondence with the white brightness data level of the first to nth common voltage levels defined at the predetermined look-up table to the liquid crystal display panel.

15. The method as claimed in claim 10, wherein selectively applying the first to nth common voltages to the liquid crystal display panel includes:

controlling an application level of the common voltage level on a basis of the black brightness data level when the detected black brightness amount and the detected white brightness amount are equal to each other.

16. The method as claimed in claim 15, selectively applying the first to nth common voltages to the liquid crystal display panel includes:

applying the common voltage level established in correspondence with the black brightness data level of the first to nth common voltage levels defined at the predetermined look-up table to the liquid crystal display panel.

17. The method as claimed in claim 10, wherein selectively applying the first to nth common voltages to the liquid crystal display panel includes:

controlling an application level of the common voltage level on a basis of the white brightness data when the detected black brightness amount and the detected white brightness amount are equal to each other.

18. The method as claimed in claim 17, wherein selectively applying the first to nth common voltages to the liquid crystal display panel includes:

applying the common voltage level established in correspondence with the white brightness data level of the first to nth common voltage levels defined at the predetermined look-up table, to the liquid crystal display panel.

19. The driving apparatus as claimed in claim 1, wherein the controller is arranged to supply a common voltage level of the levels of the $1^{st}$ to $n^{th}$ common voltages defined at the predetermined look-up table corresponding to the detected brightness data level.

20. The method as claimed in claim 10, wherein selectively applying the first to nth common voltages to the liquid crystal display panel includes:

supplying a common voltage level of the levels of the $1^{st}$ to $n^{th}$ common voltages defined at the predetermined look-up table corresponding to the detected brightness data level.

* * * * *